(12) United States Patent
Gao et al.

(10) Patent No.: US 8,573,497 B2
(45) Date of Patent: Nov. 5, 2013

(54) ADAPTIVE DATA READER AND METHOD OF OPERATING

(75) Inventors: WenLiang Gao, Eugene, OR (US); Craig D. Cherry, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 199 days.

(21) Appl. No.: 13/106,659

(22) Filed: May 12, 2011

(65) Prior Publication Data
US 2012/0000982 A1 Jan. 5, 2012

Related U.S. Application Data

(60) Provisional application No. 61/360,290, filed on Jun. 30, 2010.

(51) Int. Cl.
*G06K 7/10* (2006.01)

(52) U.S. Cl.
USPC ..................... 235/455; 235/462.23

(58) Field of Classification Search
USPC ........ 235/455, 462.2, 462.21, 462.22, 462.23
See application file for complete search history.

(56) References Cited

U.S. PATENT DOCUMENTS

| | | | |
|---|---|---|---|
| 4,315,245 A | 2/1982 | Nakahara et al. | |
| 4,949,391 A | 8/1990 | Faulkerson et al. | |
| 4,969,034 A | 11/1990 | Salvati | |
| 5,572,006 A * | 11/1996 | Wang et al. | 235/454 |
| 5,585,616 A | 12/1996 | Roxby et al. | |
| 6,061,091 A | 5/2000 | Van de Poel et al. | |
| 6,065,678 A | 5/2000 | Li et al. | |
| 6,254,003 B1 | 7/2001 | Pettinelli et al. | |
| 6,347,163 B2 | 2/2002 | Roustaei | |
| 6,505,778 B1 | 1/2003 | Reddersen et al. | |
| 6,708,883 B2 | 3/2004 | Krichever | |
| 6,749,120 B2 | 6/2004 | Hung et al. | |
| 6,825,486 B1 | 11/2004 | Cole et al. | |
| 6,906,699 B1 | 6/2005 | Fahraeus et al. | |
| 6,980,692 B2 | 12/2005 | Chamberlain | |
| 7,147,159 B2 | 12/2006 | Longacre, Jr. et al. | |
| 7,172,125 B2 | 2/2007 | Wang et al. | |

(Continued)

FOREIGN PATENT DOCUMENTS

| | | |
|---|---|---|
| KR | 10-2007-0063899 A | 6/2007 |
| KR | 10-2009-0110245 | 10/2009 |

OTHER PUBLICATIONS

Hensel Jr., "Cell phone boarding passes going into use here first," http://www.chron.com/disp/story.mpl/front/5349969.html, Dec. 12, 2007.

(Continued)

*Primary Examiner* — Karl D Frech
(74) *Attorney, Agent, or Firm* — Stoel Rives LLP

(57) ABSTRACT

Disclosed systems and methods preferably capture one or more images of an item bearing an optical code and analyze such images to determine whether the item has a highly, or relatively highly, reflective surface or not. Based on such a determination, operating parameters of the system, such as the gain, exposure time, and amount of illumination, are preferably automatically adjusted by the system to capture a subsequent image of the item where the subsequent image has sufficient contrast to decode the optical code. The subsequent image may include a plurality of images, and different operating parameters may be used to capture several, or each, of the plurality of images based on the determination of whether the item has a highly, or relatively highly, reflective surface or not.

23 Claims, 8 Drawing Sheets

(56) References Cited

U.S. PATENT DOCUMENTS

| | | |
|---|---|---|
| 7,204,420 B2 | 4/2007 | Barkan et al. |
| 7,290,711 B2 | 11/2007 | Barkan |
| 7,398,927 B2 | 7/2008 | Olmstead et al. |
| 7,461,790 B2 | 12/2008 | McQueen et al. |
| 7,475,821 B2 | 1/2009 | Barkan et al. |
| 7,490,776 B2 | 2/2009 | Thuries |
| 7,494,065 B2 | 2/2009 | Barkan et al. |
| 7,546,951 B2 | 6/2009 | Kotlarsky et al. |
| 2002/0067850 A1 | 6/2002 | Williams et al. |
| 2003/0098352 A1 | 5/2003 | Schnee et al. |
| 2004/0246367 A1 | 12/2004 | Yoshida |
| 2005/0253937 A1 | 11/2005 | Moholt et al. |
| 2007/0001015 A1 | 1/2007 | Suzuki et al. |
| 2007/0034696 A1 | 2/2007 | Barkan et al. |
| 2008/0035732 A1 | 2/2008 | Vinogradov et al. |
| 2008/0080785 A1 | 4/2008 | Ford |
| 2009/0108076 A1 | 4/2009 | Barkan et al. |
| 2009/0167490 A1 | 7/2009 | Hayaashi et al. |

OTHER PUBLICATIONS

Reardon, "Cell phone as boarding pass," http://news.cnet.com/8301-10784_3-9896859-7.html, Mar. 18, 2008.

TSA Blog, "TSA Paperless Boarding Pass Pilot Expanding," http://www.tsa.gov/blog/2009/06/tsa-paperless-boarding-pass-pilot.html, Jun. 18, 2009.

Mobile Commerce Daily, "Hexaware launches 2D bar code boarding pass service," http://www.mobilecommercedaily.com/hexaware-launches-2d-bar-c . . . , Nov. 30, 2009.

American Airlines, "Introducing Mobile Boarding Passes," http://www.aa.com/i_I8n/urls/mobileBoarding.jsp, accessed Feb. 19, 2010.

International Search Report, PCT/US2011/036295, mailed Nov. 23, 2011.

\* cited by examiner

ADAPTIVE DATA READER AND METHOD OF OPERATING

RELATED APPLICATIONS

This application claims priority under 35 U.S.C. §119(e) to U.S. Application No. 61/360,290 filed on Jun. 30, 2010, which is fully incorporated herein by reference.

BACKGROUND

Optical codes, such as barcodes and other machine-readable indicia, appear in various places in a variety of applications. There are a variety of such optical codes, including: linear barcodes (e.g., UPC code), 2D codes including stacked barcodes (e.g., PDF-417 code), and matrix codes (e.g., Datamatrix code, QR code, or Maxicode). Businesses have begun sending optical codes to customers who display such optical codes on a portable electronic device, such as a mobile telephone, personal digital assistant, palm, tablet, or laptop computer, or other suitable device having an electronic display, such as a liquid crystal display (LCD). For example, an airline passenger may display an optical code on a portable electronic device for an airline employee to read using a data reader as verification of the passenger's ticket. Or, a customer in a store may display an optical code on a portable electronic device for a cashier to read using a data reader to redeem a coupon. Optical codes are also included on other items having highly, or relatively highly, reflective surfaces, for example, but not limited to, identification (ID) cards, aluminum cans, and objects in plastic packaging.

The present inventors have recognized that optical codes presented on, or under, a highly, or relatively highly, reflective surface are typically difficult to decode using general-purpose data readers. For example, the present inventors have recognized that general-purpose data readers commonly use artificial illumination to illuminate an object bearing an optical code to create an image of the optical code having sufficient contrast for decoding the optical code. The present inventors have also recognized that highly, or relatively highly, reflective surfaces bearing optical codes commonly reflect a large amount of such artificial illumination resulting in a saturated, or partially saturated, image that does not have sufficient contrast for decoding the optical code because all, or portions, of the image appear light, or white. Thus, the present inventors have identified a need for a general-purpose data reader that has greater versatility in handling reading of optical codes appearing on (or behind) highly, or relatively highly, reflective surfaces.

SUMMARY

Methods and systems are disclosed for improved reading of optical codes regardless of whether the optical code is presented on a highly reflective or other surface.

In a preferred system/method, one or more images of an item bearing an optical code are captured and the captured images are analyzed to determine whether the item has a highly, or relatively highly, reflective surface or not. Based on such a determination, operating parameters of the system, such as the gain, exposure time, direction of illumination, and amount of illumination, are preferably automatically adjusted by the system to capture a subsequent image of the item where the subsequent image has sufficient contrast to decode the optical code. The subsequent image may include a plurality of images, and different operating parameters may be used to capture several, or each, of the plurality of images based on the determination of whether the item has a highly, or relatively highly, reflective surface or not.

Additional aspects and advantages will be apparent from the following detailed description of preferred embodiments, which proceeds with reference to the accompanying drawings.

DETAILED DESCRIPTION OF PREFERRED EMBODIMENTS

The described features, structures, characteristics, and methods may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or operations are not shown or not described in detail to avoid obscuring aspects of the embodiments. For convenience, the methods and systems may be described herein with reference to optical codes, however, it is understood that the methods described herein are applicable to any host computer and to any type of optically readable code, such as, but not limited to, those described above, fingerprints, and other suitable codes.

Figure 1:
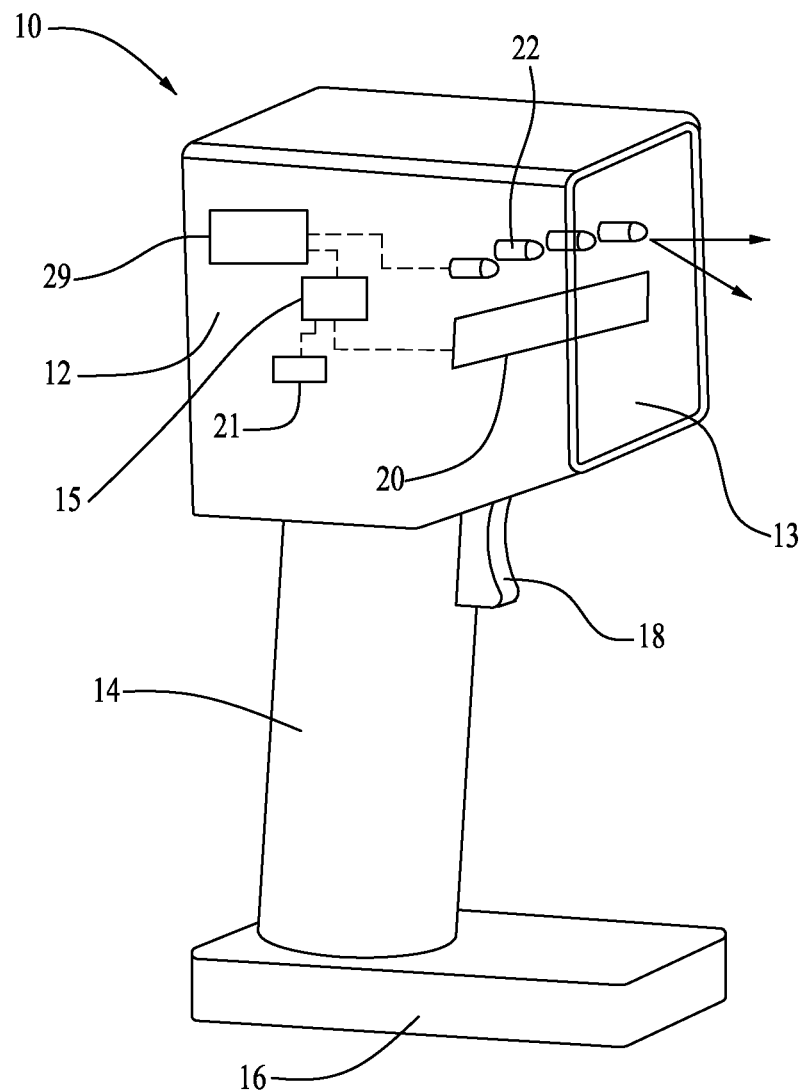
FIG. 1 is a schematic view of an exemplary data reader.
Figure 2:
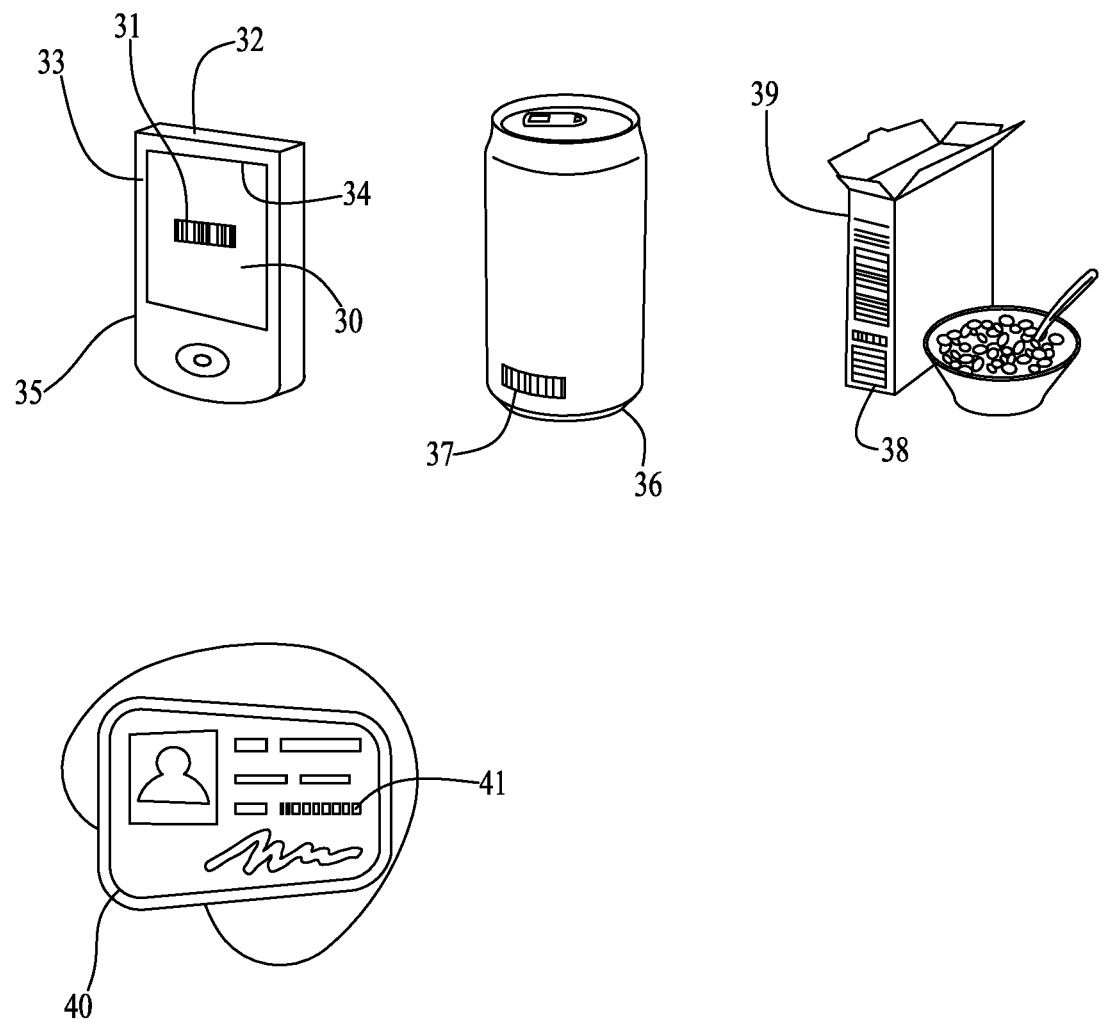
FIG. 2 is a schematic view of exemplary items bearing optical codes.

FIG. 1 is a diagrammatic view of a data reader 10 in accordance with a first embodiment. Preferably, the data reader 10 includes a processor 15 that is programmed to analyze an image scene to determine whether it is advantageous to change one or more operating parameters of the data reader 10. Such image analysis could occur for every frame captured by an imager 20, or alternately, may not occur for every frame, for example, image analysis may occur on a periodic basis.

The data reader 10 is schematically depicted as a presentation scanner suitable for reading optical codes, symbols, or other items. The data reader 10 includes a head portion 12 attached to a handle or stand portion 14, with the handle or stand portion 14 mounted onto a base 16. Data reader 10 may operate as a presentation scanner being self-supported on a horizontal surface or fixed/mounted to a wall or other surface. The data reader 10 is self-supporting (i.e., freestanding) on the base 16 making it usable in a hands free mode of operation. The data reader 10 may also be grasped about the handle and operated in a hand-held or portable mode. In any of a mounted, hands-free, or hand-held mode, data reading may be activated by actuation of the trigger 18, automatically by the processor 15 detecting the presence of an item within a scan volume in front of window 13, or by always being in a capture and decode images mode as long as the data reader 10 is in a scanning mode, or other suitable process. The data reader 10 may have other suitable forms. An optical code, such as optical codes 31, 37, 38, or 41, on an item such as an electronic display screen 30, beverage can 36, cereal box 39, ID card 40, or other suitable item may be read by presenting the item bearing the optical code into a data read volume in front of the window 13. The data reader 10 includes an illumination source 22 comprised in this embodiment of four LEDs arranged in a line above the imager 20. Preferably, the illumination source 22 illuminates the optical code on the item presented to the data reader 10.

The data reader 10 preferably comprises an imager 20 such as a complementary metal oxide semiconductor (CMOS) imager. Alternately, a charged couple device (CCD) or other suitable imager may be used. The imager 20, alone or together with logic components such as a complex programmable logic device (CPLD) or a field-programmable gate array (FPGA), is coupled to the processor 15, which, among other functions, is preferably programmed to control operating parameters of the data reader 10 as discussed in detail below. Processor 15 is also preferably programmed to read and decode optical codes or other symbols or imaged items. A CMOS imager has a field of view including the read volume within which a target item is preferably presented for imaging. A CMOS imager may comprise an active-pixel imaging sensor with a global shutter, such as a model MT9V022 sensor sold by Aptina Imaging of San Jose, Calif., USA, or may operate on a rolling basis.

The processor 15 may comprise any suitable digital processor, such as a low-power DSP core or ARM core processor. In preferred embodiments, processor 15 comprises an ARM9 processor AT91 SAM9G20 sold by Atmel of San Jose, Calif., USA, or OMAP processor sold by Texas Instruments of Dallas, Tex., USA or an i.MX1 series processor (such as the MC9328MX1 processor) sold by Freescale Semiconductor, Inc. of Austin, Tex., USA. Alternately, multiple processors or sub-processors or other types of processor electronics such as comparators or other specific function circuits may be used alone or in combination. For the purposes of this description, the term processor is meant to include any of these combinations.

The illumination source 22 preferably comprises a collection of LEDs, for example, infrared or visible spectrum LEDs, but may alternatively comprise another suitable light source, such as a lamp or laser diode. The illumination sources may be coupled to and controlled by the processor 15, or may be remotely mounted and powered. A power supply circuit 29 is preferably provided for energizing the LEDs.

A memory 21, such as a flash memory, random access memory, or other suitable memory, communicates with processor 15. Alternately, memory 21 may be integrated with processor 15.

Figure 3:
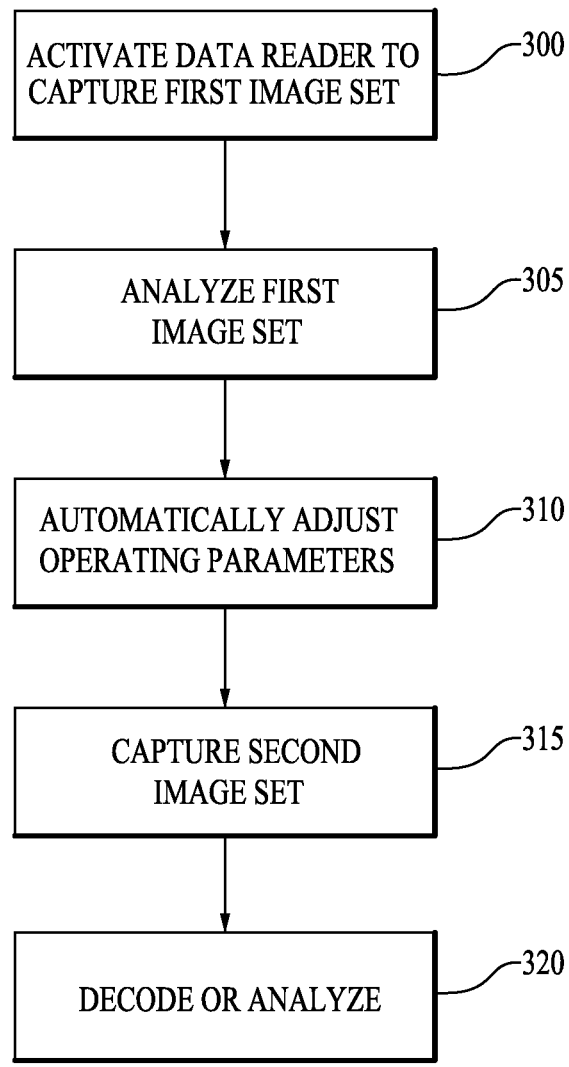
FIG. 3 is a flow chart of a preferred method.

FIG. 3 is a flow chart of a preferred method for operating data reader 10 to capture and decode an optical code. At step 300, data reader 10 is activated, preferably by processor 15 detecting an item, such as electronic device 32, within a read volume or by activation of trigger 18, to capture a first set of images of the item bearing an optical code, such as optical code 31. The first set of images may include only one image, but preferably includes two, three, four, or five images. Alternately, data reader 10 may continuously be on, i.e., operate or scan continuously.

In one embodiment, data reader 10 is preferably activated upon detecting an object within a read volume and determining that the object is relatively stationary within the read volume for one or more image frames. Determining whether an object is relatively stationary within a read volume may be accomplished in a variety of manners. For example, a pixel-by-pixel grayscale difference for two images may be obtained to create an absolute grayscale difference for the two images. Such an absolute difference is preferably compared against a configurable threshold value, which may be about 15% to about 20%, or other suitable value, to determine whether an object moved from one image to the next. If the difference is lower than the configurable threshold value, then processor 15 determines that an object is relatively stationary.

Alternately, or in addition, whether an item is positioned in a portion of a read volume such as a near field or far field, may be determined. For example, an average grayscale value may be obtained for an image and compared to two thresholds. Preferably, for an eight bit imager, an average grayscale of 29 or less indicates an object is in a far field, and an average grayscale of 43 or higher indicates an object is in a near field. A separation between the two thresholds is preferably included to reduce the likelihood that a data reader will rapidly switch between a near field mode and a far field mode when an object is near the intersection of the two fields. Preferably, data reader 10 is set to the near field mode when an average grayscale value falls between the two thresholds and the previous average grayscale value was used to set or keep the data reader 10 in the near field mode. Likewise, data reader 10 is preferably set to the far field mode when an average grayscale value falls between the two thresholds and the previous average grayscale value was used to set or keep the data reader 10 in the far field mode.

In one embodiment, data reader 10 uses a set of operating parameters that was used to capture the most recent images of a previous item as an initial set of operating parameters. In other embodiments, data reader 10 uses a predetermined set of operating parameters as an initial set of operating parameters. In other embodiments, data reader 10 may use a predetermined set of operating parameters as an initial set of operating parameters, adjust operating parameters based on image scene analysis as needed, and return to using the predetermined set of operating parameters when presence of an object in the read volume is not detected, or after a timeout occurs for one or more image frames. A predetermined set of operating parameters may be set by the manufacturer and stored in memory 21 communicating with processor 15, for example. Operating parameters preferably include at least the amount of gain for imager 20, the exposure duration for imager 20, and the amount of illumination provided by illumination source 22. Alternately, other suitable operating parameters may be adjusted, such as illumination direction or angle, for example.

The first set of images of an item, such as the display screen 30 of an electronic device 32, are analyzed at step 305. Data reader 10 preferably uses processor 15 to determine whether an item is part of a recognized class. One or more recognized classes are preferably stored in memory 21. One preferred recognized class includes items bearing an optical code, or capable of bearing an optical code, on or under a relatively highly reflective surface. Another exemplary class includes items bearing an optical code, or capable of bearing an optical code, on or under a highly reflective surface. Another exemplary class includes items bearing an optical code, or capable of bearing an optical code, on or under either a relatively highly reflective surface or a specular surface. Preferably, a relatively highly reflective surface has a reflection coefficient of about 30% or higher. Alternately, a specular surface has a surface roughness average (Ra) of less than 0.0125 microns. Alternately, a relatively highly reflective surface has a height variation of the surface texture that is considerably smaller than the wavelength of visible light, for example, a surface meeting the definition specified in ISO 10110-8. A highly reflective surface is preferably more reflective than a relatively highly reflective surface.

For example, processor 15 may analyze the first set of images to determine whether an imaged item is an electronic device having a display screen. Alternately, processor 15 may analyze the first set of images to determine whether an imaged item is an identification card, such as a driver's license, reward card, etc. Alternately, processor 15 may analyze the first set of images to determine whether an imaged item is a different type of relatively highly reflective object, such as a glass or aluminum beverage container, such as can 36, a plastic bag or other shiny plastic package, or other suitable object. A recognized class may include one or more of the foregoing (electronic device, identification card, other type of relatively highly reflective objects such as a soda can), or may include other suitable objects.

Processor 15 may use any suitable technique for analyzing the first set of images. One exemplary technique for determining whether an item is an electronic device, such as electronic device 32 having a display screen (e.g., display screen 30), is to seek a geometric shape, such as shape 34, nested within a similar geometric shape, such as shape 35. Many electronic device display screens are rectangular in shape, and the housing for such display screens is commonly rectangular, or substantially rectangular. By analyzing the first set of images to detect a shape nested within a similar shape, processor 15 may be programmed to determine that an item having the nested shape is an electronic device with a display screen. Alternately, processor 15 may run a program, algorithm, or image analysis process, such as SentiSight 2.1 by Neurotechnology of Vilnius, Lithuania, the scale invariant feature transformation, for example, as described by David G. Lowe in "Object Recognition from Local Scale-Invariant Features," Proceedings of the International Conference on Computer Vision, Corfu, Greece, September, 1999 and in "Local Feature View Clustering for 3D Object Recognition," Proceedings of the Institute of Electrical and Electronics Engineers, Inc., Conference on Computer Vision and Pattern Recognition, Kauai, Hi., December 2001, both of which are fully incorporated herein by reference, the rotation invariant transformation method, the speeded up robust features method, or other suitable method to recognize items appearing in the read volume.

At step 310, the processor 15 automatically adjusts the operating parameters the data reader 10 uses to capture images with the imager 20. Such automatic adjustment is preferably based on the determination of whether an item, such as electronic device 32, is in the recognized class or not. If the item is determined not to be in the recognized class the processor 15 preferably establishes an initial set of operating parameters for use with items outside the recognized class, for example, cereal box 39. If the item is determined to be in the recognized class the processor 15 preferably establishes a secondary set of operating parameters for use with items in the recognized class, for example, electronic device 32 or soda can 36.

Alternately, a combination of the initial and secondary sets of operating parameters may be established for use. For example, in one embodiment the processor 15 automatically adjusts the operating parameters to enable imager 20 to capture subsequent images at step 315 using the initial set of operating parameters for a majority of image captures and the secondary set of operating parameters for a minority of image captures when an item is determined not to be in the recognized class. The processor 15 also automatically adjusts the operating parameters to enable imager 20 to capture subsequent images at step 315 using the secondary set of operating parameters for a majority of image captures and the initial set of operating parameters for a minority of image captures when an item is determined to be in the recognized class. In a preferred embodiment, a majority of image captures at step 315 is about 75% of the captured images and a minority of image captures at step 315 is about 25% of the captured images. Initial and secondary sets of operating parameters may be automatically adjusted using (i) predefined parameters stored in a memory, (ii) parameters that are dynamically created in response to analysis of the first set of images, the second set of images, or both sets of images, or (iii) a combination of predefined and dynamically created operating parameters.

Other majority/minority percentages, such as, but not limited to, 51%-49%, 60%-40%, 70%-30%, 80%-20%, and 90%-10% may be used in other embodiments. The type or identity of an imaged item may be determined by processor 15 as described below, as well as determining whether the imaged item is in a recognized class. Based on the type or identity of the item, whether the item is in a recognized class, or both, it may be advantageous to change the majority/minority percentages. For example, for an item with a slightly reflective surface, i.e., less reflective than a relatively highly reflective surface, it may be beneficial to have the majority/minority percentages relatively close, such as 51%-49% or 60%-40%, to efficiently capture an image of the item with sufficient contrast to decode an optical code. As another example, for an item with either a relatively non-reflective surface or a highly reflective surface (a highly reflective surface being more reflective than a relatively highly reflective surface), it may be beneficial to have the majority/minority percentages relatively far apart, such as 80%-20% or 90%-10%, to efficiently capture an image of the item with sufficient contrast to decode an optical code.

In a preferred embodiment, an initial set of operating parameters is set by the manufacturer, stored in memory 21, and may act as a default set of operating parameters, for example, by being established as the operating parameters for use each time data reader 10 is powered on. Such an initial set of operating parameters preferably includes a baseline gain and exposure time for imager 20, and a baseline illumination amount for light source 22. Preferably, a secondary set of operating parameters includes an increased gain for the imager 20, an increased exposure time for the imager 20, or both. A secondary set of operating parameters also preferably includes a decreased illumination amount for light source 22, which may be decreased to the point of being turned off. The amount of illumination provided by light source 22 may be decreased by lessening the intensity (lumens) of light provided, by shortening the duration for which light source 22 is activated, or both. Such a secondary set of operating parameters is preferably stored in memory 21, but may be dynamically created by processor 15 in response to image analysis.

At step 315 a second set of images of an item, such as electronic device 32, is captured by data reader 10 using the automatically adjusted operating parameters. The second set of images preferably includes from two to five images, but may include only one image. At step 320 an optical code 31 borne on display screen 30 is decoded, preferably by processor 15 or by a suitable processor operatively connected to processor 15. In an alternate embodiment, an attempt to decode the optical code 31 borne on display screen 30 may be made after step 300 and before step 305. Alternately, an optical code may not be borne on the imaged item, but a different symbol, such as a fingerprint, blood vessel pattern, or other suitable biometric, may be borne on or by the item. Processor 15, or a suitable processor operatively connected to processor 15, may analyze such a symbol to determine whether such a symbol is contained in a database of symbols, for identifying an individual, for example.

Figure 4:
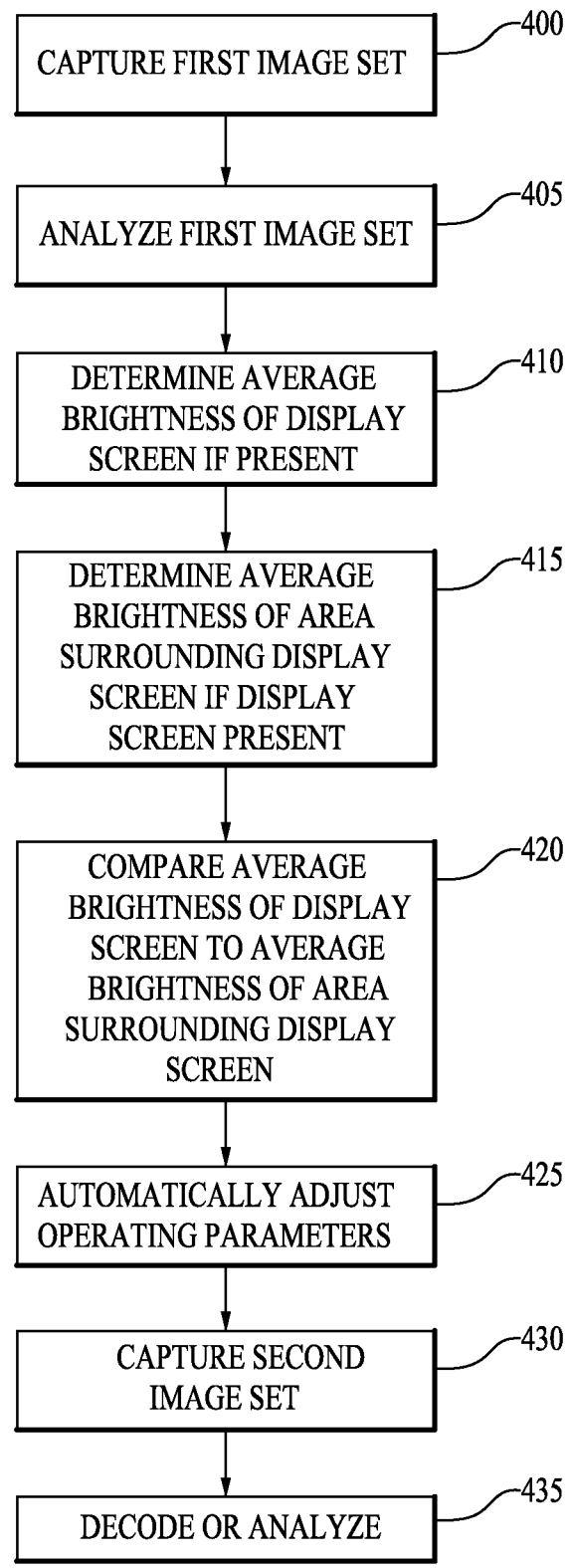
FIG. 4 is a flow chart of another preferred method.

In alternate embodiments, two or more operating parameter sets may be used. For example, when processor 15 determines that an item is an electronic device, such as electronic device 32, with a display screen, such as display screen 30, additional processing may occur to determine whether the display screen is backlit or not. FIG. 4 is a flow chart illustrating a preferred process having the following steps.

At step 400, capturing a first set of images of an item.

At step 405, analyzing the first set of images includes determining whether the item, such as electronic device 32, is in a recognized class, such as a class including electronic devices having display screens, glass bottles, and aluminum cans. Other recognized classes including similar or different types of items with relatively highly reflective surfaces may be used. If processor 15 determines there is an item in the recognized class in the read volume, processor 15 preferably continues to analyze the first set of images to determine if there is a display screen, for example, by looking for a nested geometric shape. Other suitable image analysis techniques may be used.

At step 410, analyzing portions of the first set of images, preferably by the processor 15, that include the display screen 30 to determine an average brightness for the display screen 30. For example, an average brightness for the display screen 30 may be determined by processor 15 determining which pixels captured a portion of the nested geometric shape and which pixels captured an image of the centroid of such nested geometric shape. Preferably, the grayscale value for the pixels used to capture the image of such a nested geometric shape is compared against the grayscale value of the pixels used to capture the image of the centroid of such a nested geometric shape to calculate an average brightness for the display screen 30.

At step 415, analyzing the portion of the image including the area 33 surrounding the display screen 30, preferably by the processor 15, to determine an average brightness for the area 33 surrounding the display screen 30. Preferably, processor 15 determines which pixels captured the image of the area 33, and determines an average brightness for the area 33, preferably by using a grayscale of such pixels. For example, thresholding may be applied to such a grayscale to create a binary image of the area 33 and the binary image can be processed to determine an average brightness.

At step 420, comparing the average brightness for the display screen 30 against the average brightness for the area 33 surrounding the display screen 30, preferably by the processor 15, to determine whether the display screen 30 is backlit or not. For example, processor 15 may compare the average brightness determined at step 410 against the average brightness determined at step 415. If the averages brightness determined at step 410 is substantially the same as the average brightness determined at step 415, for example, within a 25% difference, processor 15 may determine that the display screen 30 is not backlit. If the average brightness determined at step 410 is higher than the average brightness determined at step 415, for example, by more than about a 25% difference, processor 15 may determine that the display screen 30 is backlit.

At step 425, processor 15 automatically adjusting operating parameters for data reader 10. If processor 15 determines the item in the read volume is not in the recognized class, processor 15 establishes an initial set of operating parameters for use with items not in the recognized class when capturing a second set of images. If processor 15 determines there is an electronic device with a backlit electronic display, processor 15 establishes a secondary set of operating parameters for use with such electronic devices when capturing a second set of images. If processor 15 determines there is an electronic device with a display that is not backlit, processor 15 establishes a tertiary set of operating parameters for use with such electronic devices when capturing a second set of images. Preferably, (i) the initial set of operating parameters includes a gain setting, an exposure duration, and an illumination amount for data reader 10, (ii) the secondary set of operating parameters includes either one or both of a gain setting that is greater than the gain setting of the initial set and an exposure duration that is longer than the exposure duration of the initial set, and also includes an illumination amount that is less than the illumination amount of the initial set, and (iii) the tertiary set of operating parameters includes either one or both of a gain setting that is greater than the gain setting of the secondary set and an exposure duration that is longer than the exposure duration of the secondary set, and also includes an illumination amount that is less than the illumination amount of the secondary set. Sets of operating parameters may be automatically adjusted using (i) predefined parameters stored in a memory, (ii) parameters that are dynamically created in response to analysis of the first set of images, the second set of images, or both sets of images, or (iii) a combination of predefined and dynamically created operating parameters.

At step 430, the data reader 10 capturing a second set of images of electronic device 32 using the automatically adjusted operating parameters. The second set of images preferably includes two to five images, but may include only one image.

At step 435 an optical code 31 borne on display screen 30 is decoded, preferably by processor 15 or by a suitable processor operatively connected to processor 15. In an alternate embodiment, an attempt to decode the optical code 31 borne on display screen 30 may be made after step 400 and before step 405. Alternate embodiments may perform different analysis on the first set of captured images, and may include three, or more, sets of operating parameters.

In some embodiments, the data reader 10 may revert to an initial set of operating parameters after reading a label and a set number of image frames are captured during the second set of images, such as one, two, three, four, five, or more image frames. In other embodiments, the data reader 10 may continue to analyze the second set of images captured at step 430 to determine whether the processor 15 should automatically adjust operating parameters for data reader 10. If, during such analysis of the second set of images, processor 15 determines (1) the item in the read volume is not in the recognized class, (2) there is an electronic device with a backlit electronic display, or (3) there is an electronic device with a display that is not backlit, processor 15 establishes an appropriate set of operating parameters, for example as discussed above. The optical code 31 is decoded at step 435 and the data reader 10 may revert to an initial set of operating parameters after the remaining images of the second set of images are captured. Processes performed during steps 430 and 435 may be alternating, for example, decoding may be attempted after the capture of each image of the second set of images, or sequential, for example, decoding may be attempted after the capture of two or more images of the second set of images.

Figure 5:
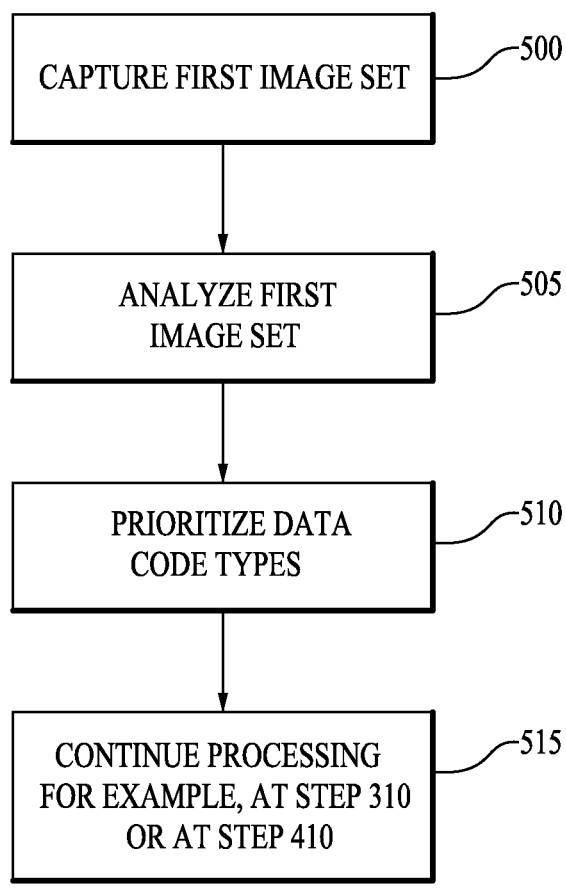
FIG. 5 is a flow chart of another preferred method.

FIG. 5 illustrates a flow chart for another preferred method. At step 500 a first set of images is captured in response to an item moving into a read volume in front of window 13 or in response to activation of trigger 18. The first set of images is analyzed at step 505 to identify the item. For example, image analysis programs or techniques described above may be used to identify the item, such as an ID card 40. Based on the identity of the item, the processor 15 prioritizes one or more types of expected optical code types for decoding at step 510. For example, many ID cards commonly bear a PDF 417 optical code. In response to identifying the item as an ID card, processor 15 may prioritize PDF 417 by ranking it as the first optical code type to attempt to decode. Alternately, processor 15 may prioritize PDF 417 by establishing a longer processing time for PDF 417 compared to the normal processing time allotted for PDF 417. Alternately, both ranking and processing time may be modified as a result of prioritizing. Such ranking and processing time modifications may occur for a single optical code type, or for multiple optical code types. Other item identity/optical code type associations may be used. Subsequent processing may occur as described above with respect to steps 310 through 320, with respect to steps 410 through 435, both described above, or other suitable steps.

Figure 6:
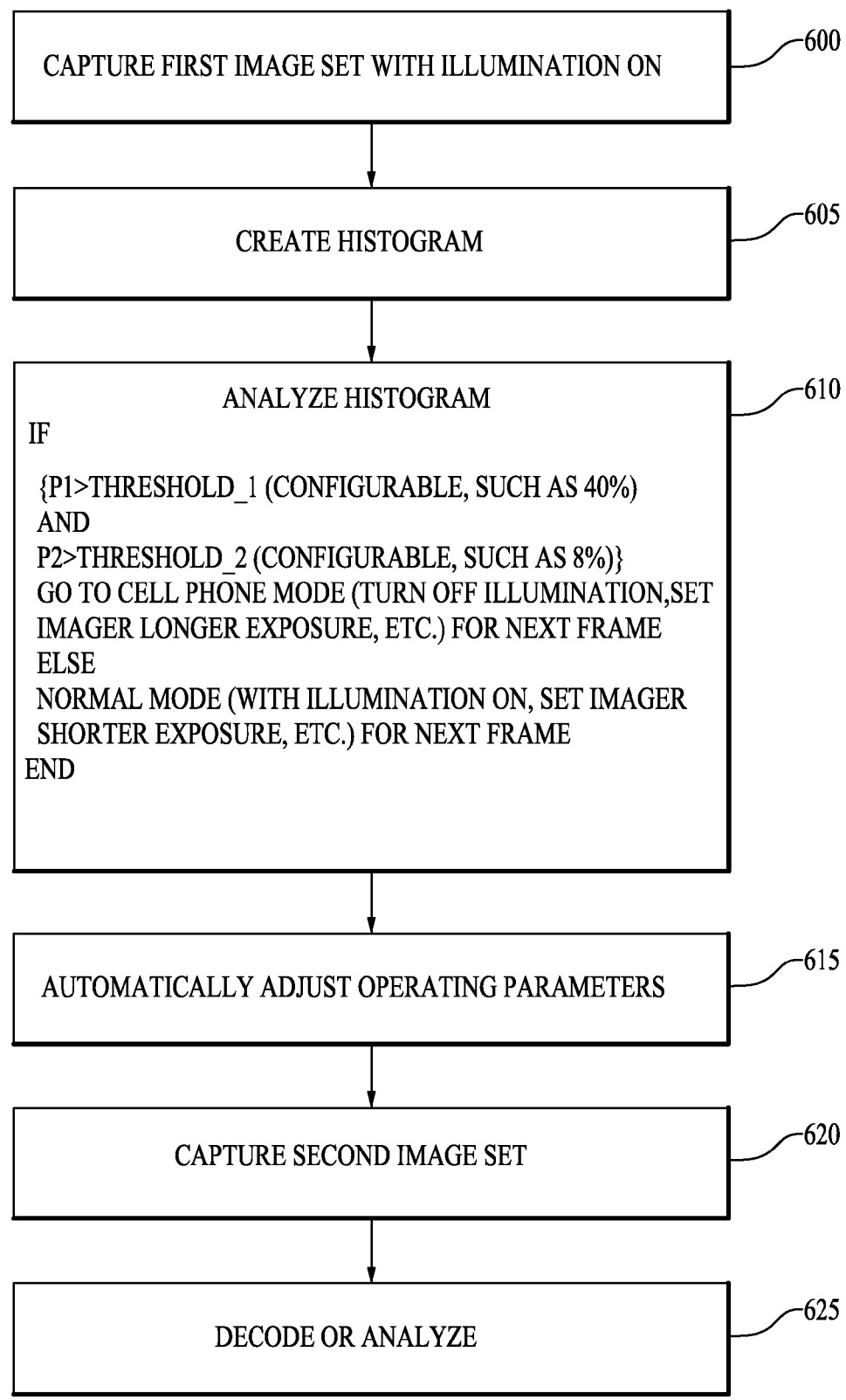
FIG. 6 is a flow chart of another preferred method.
Figure 7:
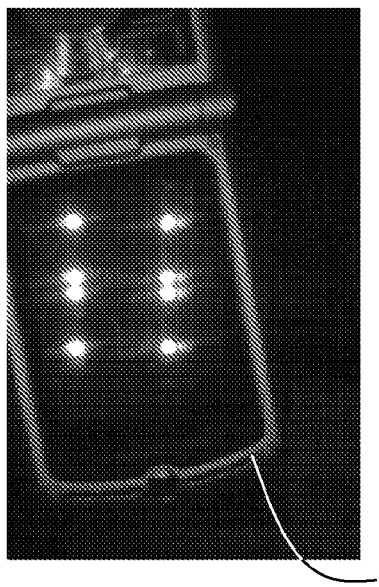
FIG. 7 is an exemplary illustration of an image of an item having a relatively highly reflective surface taken by a data reader using its own illumination source.
Figure 8:
FIG. 8 is an exemplary illustration of an image of an item having a less relatively highly reflective surface than the item of FIG. 7 taken by a data reader using its own illumination source.

In alternate embodiments, image scene analysis may preferably include creating and analyzing a histogram of pixel levels for imager 20. For example, FIG. 6 is a flow chart for an exemplary process for creating and analyzing a histogram representing exposure levels for pixels of imager 20, comprising the steps of:

At step 600, in response to an item bearing an optical code moving into a read volume in front of window 13 or in response to activation of trigger 18, a first set of images is captured with the illumination source 22 on. The first set of images may be of an item with a relatively highly reflective surface, such as an electronic device 700 with a display screen capable of bearing an optical code as illustrated in FIG. 7. Alternately, the first set of images may be of an item with a less relatively highly specular reflective surface or a highly reflective but diffuse surface, such as a box 800 with a printed optical code 805 under a plastic sleeve as illustrated in FIG. 8.

Figure 9:
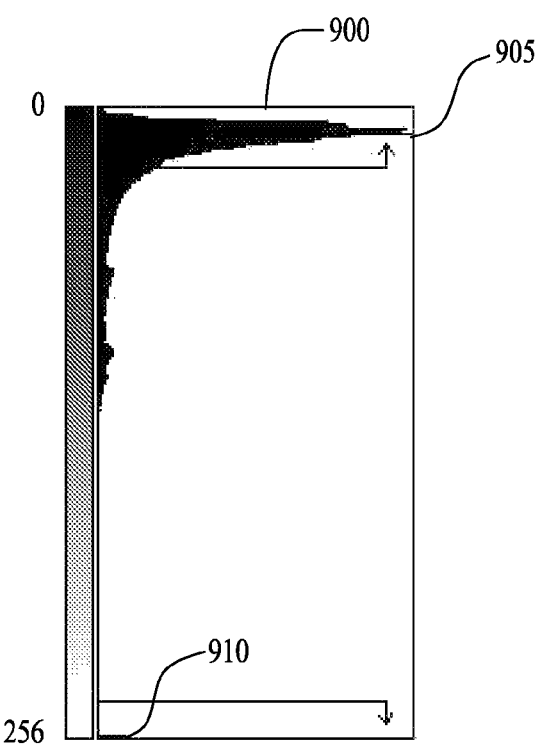
FIG. 9 is an exemplary histogram of the image of the item of FIG. 7.
Figure 10:
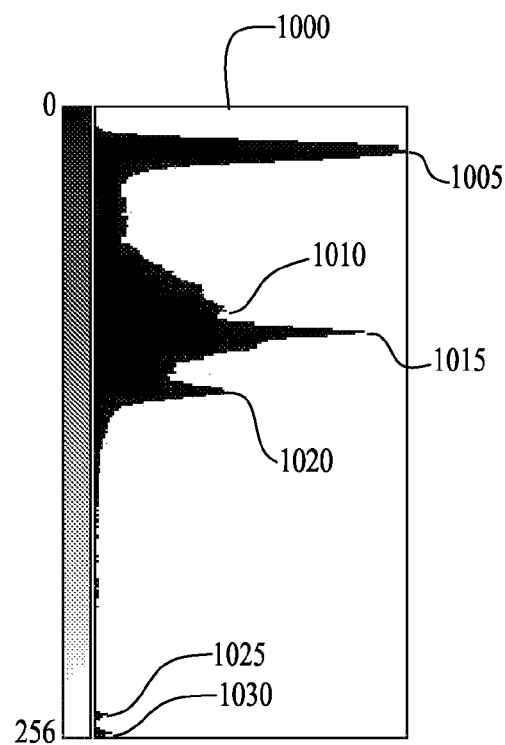
FIG. 10 is an exemplary histogram of the image of the item of FIG. 8.

At step 605, a histogram is created based on the first set of images. Preferably the histogram corresponds to all or a subset of the pixels of imager 20. In a preferred embodiment, imager 20 creates a histogram representing the grayscale of each pixel of imager 20. Alternately, imager 20 creates a histogram for a subset of pixels, for example, those that make up a virtual scan line, and uses such a histogram of a subset of pixels as representative of all of the pixels of imager 20. Alternately, processor 15, or other suitable processor, may create histograms corresponding to saturation levels for each pixel, or a subset of pixels. An exemplary histogram corresponding to pixel saturation for the image illustrated in FIG. 7 is illustrated in FIG. 9. As illustrated in FIG. 9, histogram 900 includes two distinct peaks 905 and 910. Peak 905 corresponds to a number of dark, and relatively dark, pixels. Peak 910 corresponds to a number of saturated, and relatively saturated, pixels, that is, pixels with a high and relatively high grayscale. An alternate, exemplary histogram corresponding to pixel saturation for the image illustrated in FIG. 8 is illustrated in FIG. 10. As illustrated in FIG. 10, histogram 1000 includes more than two peaks, such as peaks 1005, 1010, 1015, 1020, 1025, and 1030. Peak 1005 corresponds to a number of dark, and relatively dark, pixels. Peaks 1005, 1010, 1015, 1020, 1025, and 1030 correspond to a number of pixels whose grayscale level falls between dark, and relatively dark, and saturated, and relatively saturated.

At step 610, processor 15 preferably analyzes the histogram created at step 605 to determine whether the histogram is bi-modal, i.e., exhibits two peaks, for example, as illustrated in FIG. 9, or whether the histogram exhibits more than two peaks, for example, as illustrated in FIG. 10. One exemplary manner for analyzing the histogram includes using, or establishing, a low threshold and a high threshold. Preferably the low threshold corresponds to a number representing a range of dark, or relatively dark, pixels (low to relatively low grayscale) and the high threshold corresponds to a number representing a range of saturated, or relatively saturated, pixels (high to relatively high grayscale).

For example, an imager that captures eight bit image data preferably includes a grayscale ranging from 0 to 255, where 0 corresponds to dark pixels, (i.e., pixels receiving no, or almost no light), and 255 corresponds to saturated pixels, (i.e., pixels receiving so much light that a pixel registers a white portion of an image, even when the corresponding part of the item imaged by such a pixel is not white). In one embodiment for an eight bit imager, a low threshold may include only pixels registering 0 on the grayscale and a high threshold may include only pixels registering 255 on the grayscale. Alternately, a low threshold may include pixels in a dark-end range on the grayscale, such as 0 to 10, 0 to 20, 0 to 30, 0 to 40, 0 to 50, 0 to 60, or other suitable range, and a high threshold may include pixels in a light-end range on the grayscale, such as 200 to 255, 210 to 255, 220 to 255, 230 to 255, 240 to 255, or other suitable range.

Processor 15 preferably determines whether a first predetermined percentage of pixels fall within the low threshold and whether a second predetermined percentage of pixels fall within the high threshold. For example, processor 15 preferably obtains or calculates a first number of pixels where each pixel has a grayscale value in the low threshold, such as 0 to 75, for example. Processor 15 preferably also obtains or calculates a second number of pixels where each pixel has a grayscale value in the high threshold, such as 235 to 255, for example. Processor 15 next determines whether the first number of pixels is greater than the first predetermined percentage of pixels and whether the second number of pixels is greater than the second predetermined percentage of pixels. In one embodiment, for an imager having 360,960 pixels (a 752×480 pixel grid), a low threshold of 0 to 75 the first predetermined percentage of pixels is 40% of the imager's total number of pixels and for a high threshold of 230 to 255 the second predetermined percentage of pixels is 8% of the imager's total number of pixels. Other suitable percentages may be used for the same low and high thresholds. Alternately, other suitable percentages, or the same percentages, may be used for other suitable low and high thresholds and for imagers having the same or a different total number of pixels.

Steps 600, 605, and 610 may repeat several times, such as for five continuous frames, for example, to ensure that an electronic device, such as a cell phone, remains in the scan volume before the data reader changes one or more operating parameters, such as illumination, gain, or exposure duration.

At step 615, if the first number of pixels is greater than the first predetermined percentage of pixels and the second number of pixels is greater than the second predetermined percentage of pixels, processor 15 adjusts operating parameters for data reader 10, preferably by increasing the gain or exposure duration, or both, for imager 20 and by decreasing or turning off illumination from illumination source 22. If the first number of pixels is not greater than the first predetermined percentage of pixels or the second number of pixels is not greater than the second predetermined percentage of pixels, then processor 15 preferably does not adjust the operating parameters for data reader 10.

Figure 11:
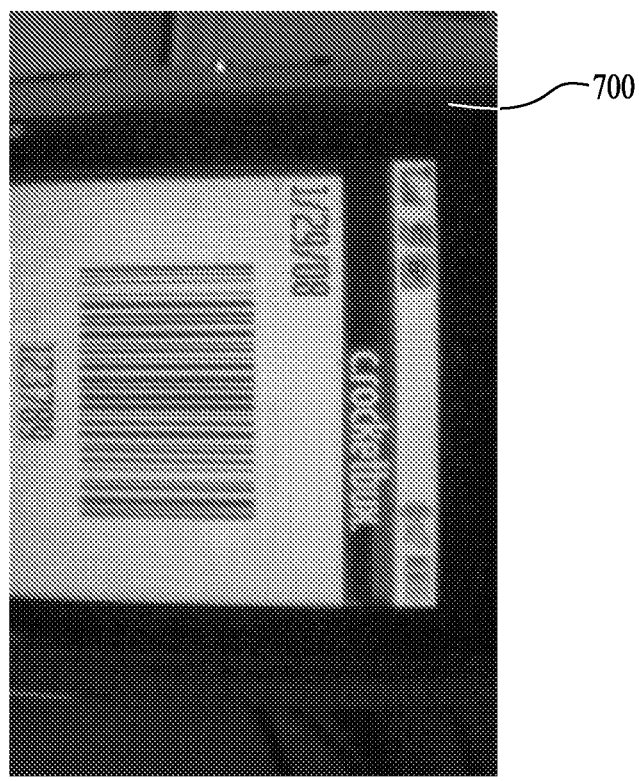
FIG. 11 is an exemplary illustration of an image of an item having a relatively highly reflective surface taken by a data reader using adjusted operating parameters, such as turning off its own illumination source.

At step 620, data reader 10 captures a second set of images of an item bearing an optical code using either the adjusted, or non-adjusted, operating parameters based on the result of step 615. For example, if the imaged item includes a relatively highly reflective surface indicated by the first number of pixels being greater than the first predetermined percentage of pixels and the second number of pixels being greater than the second predetermined percentage of pixels, the second set of images of the item using the adjusted operating parameters preferably includes an image of the optical code with sufficient contrast to be decoded, such as illustrated in FIG. 11, for example. Preferably, the optical code is decoded by processor 15 at step 625.

In some embodiments, the data reader 10 may revert to an initial set of operating parameters after reading a label and a set number of image frames are captured during the second set of images, such as one, two, three, four, five, or more image frames. In other embodiments, the data reader 10 may continue to analyze the second set of images captured at step 620, for example by repeating steps 605 and 610 for one or more images of the second set of images, to determine whether the processor 15 should automatically adjust operating parameters for data reader 10. If, during such analysis of the second set of images, processor 15 determines the operating parameters should be automatically adjusted, processor 15 appropriately adjusts the operating parameters, for example as discussed with respect to step 615. The optical code is decoded at step 625 and the data reader 10 may revert to an initial set of operating parameters after the remaining images of the second set of images are captured. Processes performed during steps 620 and 625 may be alternating, for example, decoding may be attempted after the capture of each image of the second set of images, or sequential, for example, decoding may be attempted after the capture of two or more images of the second set of images.

While certain preferred systems and methods have been sown and described, it will be apparent to one skilled in the art that modifications, alternatives and variations are possible without departing from the inventive concepts set forth herein. Therefore, the invention is intended to embrace all such modifications, alternatives and variations.

The invention claimed is:

1. A method for data reading comprising the steps of:
   capturing, via a data reader, a first set of images of an item bearing an optical code;
   performing an analysis of the first set of images to determine whether the item is in a recognized item class comprised of an item bearing an optical code on or under a relatively highly reflective surface;
   automatically setting adjusted operating parameters of the data reader based on the analysis of the first set of images of whether the item is in the recognized item class;
   capturing, via the data reader, a second set of images of the item bearing the optical code using the adjusted operating parameters; and
   processing the second set of images to decode the optical code appearing in the second set of images of the item.

2. A method according to claim 1 wherein processing the second set of images further includes:
   performing an analysis of the second set of images to determine whether the item is in a recognized item class; and
   automatically adjusting operating parameters of the data reader based on the analysis of the second set of images of whether the item is in the recognized item class.

3. A method according to claim 1
   wherein the recognized item class consists essentially of objects bearing an optical code (a) on a display screen, (b) on or under a glass surface, (c) on a metal surface having a reflectance of at least about 30%, and (d) on a plastic surface having a reflectance of at least about 30%.

4. A method according to claim 1 further comprising:
   providing the data reader with an initial operating parameter set that includes (i) a baseline gain and exposure duration for an imager and (ii) an illumination setting for an illumination source,
   wherein the step of automatically setting adjusted operating parameters includes:
   (a) if the item is in the recognized item class, establishing a secondary operating parameter set for capturing a second set of images wherein the secondary operating parameter set includes (i) an increased one or both of a gain and an exposure duration for the imager when compared to the initial operating parameter set and (ii) a decreased illumination setting for the illumination source when compared to the initial operating parameter set; and
   (b) if the item is not in the recognized item class, establishing the initial operating parameter set for capturing a second set of images.

5. A method according to claim 4 wherein the step of automatically adjusting operating parameters further includes:
   (c) establishing the secondary operating parameter set for capturing a majority of the images and establishing the initial operating parameter set for capturing a minority of the images if the item is in the recognized item class; and
   (d) establishing the initial operating parameter set for capturing a majority of the images and establishing the secondary operating parameter set for capturing a minority of the images if the item is not in the recognized item class.

6. A method according to claim 5 wherein:
   the secondary operating parameter set is established for capturing about 75% of the images and the initial operating parameter set is established for capturing about 25% of the images if the item is in the recognized item class; and
   the initial operating parameter set is established for capturing about 75% of the images and the secondary operating parameter set is established for capturing about 25% of the images if the item is not in the recognized item class.

7. A method according to claim 1 wherein the step of decoding the optical code includes automatically adjusting the data reader to first attempt to decode a particular type of optical code based on whether the item is in the recognized item class.

8. A method according to claim 1 wherein:
the step of performing analysis of the first set of images further includes identifying the item; and
the step of decoding the optical code further includes automatically adjusting the data reader to attempt to decode a particular type of optical code first based on identifying the item.

9. A method of data reading according to claim 1 wherein the relatively highly reflective surface is selected from the group consisting of (a) a display screen, (c) a glass surface, (c) a metal surface having a reflectance of at least about 30%, (d) a plastic surface having a reflectance of at least about 30%.

10. A method for data reading comprising the steps of
capturing, via a data reader, a first set of images of an item bearing an optical code;
performing an analysis of the first set of images to determine whether the item is in a recognized item class, wherein the step of performing an analysis of the first set of images includes recognizing a first shape nested within a similar second shape to identify an item bearing an optical code on a display screen;
automatically setting adjusted operating of the data reader based on the analysis of the first set of images of whether the item is in the recognized item class;
capturing, via the data reader, a second set of images of the item bearing the optical code using the adjusted operating parameters; and
processing the second set of images to decode the optical code appearing in the second set of images of the item.

11. A method according to claim 10 further comprising the steps of:
determining an average brightness of the first shape by the data reader;
determining an average brightness of an area surrounding the first shape by the data reader; and
comparing the average brightness of the first shape against the average brightness of the area surrounding the first shape to determine whether the display screen is backlit;
wherein the step of setting adjusted operating parameters is further based on whether the display screen is backlit.

12. A system for data reading comprising:
an imager for capturing an image of an item bearing an optical code;
an illumination source for illuminating the item; and
a controller for operating the imager and the illumination source, wherein the controller is programmed to,
operate the imager to capture a first set of images of the item bearing an optical code;
analyze the first set of images to determine whether the item is in a recognized item class comprising items bearing an optical code on or under a relatively highly reflective surface;
automatically adjust operating parameters of the imager and the illumination source based on whether the item is in the recognized item class;
operate the imager to capture a second set of images of the item using the adjusted operating parameters; and
analyze the optical code appearing in the second set of images of the item.

13. A system for data reading according to claim 12, wherein during analyzing the optical code the controller is further programmed to:
analyze the second set of images to determine whether the item is in a recognized item class; and
automatically adjust operating parameters of the imager and the illumination source based on whether the item is in the recognized item class.

14. A system for data reading according to claim 12, wherein the controller is further programmed to:
recognize a combination of a first shape nested within a similar second shape as a nested shape to identify an item bearing an optical code on a display screen when analyzing the first set of images.

15. A system for data reading according to claim 14, wherein the controller is further programmed to:
determine an average brightness of the first shape when analyzing the first set of images;
determine an average brightness of an area surrounding the first shape when analyzing the first set of images;
compare the average brightness of the first shape against the average brightness of the area surrounding the first shape to determine whether the display screen is backlit when analyzing the first set of images; and
wherein the programming to automatically adjust operating parameters of the imager is further based on whether the display screen is backlit.

16. A system for data reading according to claim 12, further comprising
an initial operating parameter set including (i) a baseline gain and exposure duration for the imager and (ii) an illumination setting for the illumination source, and the controller is further programmed to:
if the item is in the recognized item class, establish a secondary operating parameter set to capture a second set of images wherein the secondary operating parameter set includes (i) an increased one or both of a gain and an exposure duration for the imager when compared to the initial operating parameter set and (ii) a decreased illumination setting for the illumination source when compared to the initial operating parameter set; and
if the item is not in the recognized item class, establish the initial operating parameter set to capture a second set of images.

17. A system for data reading according to claim 16 wherein the controller is further programmed to:
establish the secondary operating parameter set to capture a majority of the images and establish the initial operating parameter set to capture a minority of the images if the item is in the recognized item class; and
establish the initial operating parameter set to capture a majority of the images and establish the secondary operating parameter set to capture a minority of the images if the item is not in the recognized item class.

18. A system for data reading according to claim 17 wherein the controller is further programmed to:
establish the secondary operating parameter set to capture about 75% of the images and establish the initial operating parameter set to capture about 25% of the images if the item is in the recognized item class; and
establish the initial operating parameter set to capture about 75% of the images and establish the secondary operating parameter set to capture about 25% of the images if the item is not in the recognized item class.

19. A system for data reading according to claim 12 wherein the controller is further programmed to decode the optical code including automatically attempting to decode a particular type of optical code first based on whether the item is in the recognized item class.

20. A system for data reading according to claim 12 wherein the controller is further programmed to:
- analyze the first set of images to identify the item; and
- decode the optical code including automatically attempting to decode a particular type of optical code first based on identifying the item.

21. A method for data reading comprising the steps of:
- capturing, via a data reader, a first set of images of an item bearing an optical code;
- creating a histogram based on the first set of images;
- analyzing the histogram to determine whether the histogram is bi-modal;
- automatically adjusting operating parameters of the data reader based on whether the histogram is bi-modal;
- capturing, via the data reader, a second set of images of the item bearing the optical code using the adjusted operating parameters; and
- processing the second set of images to decode the optical code appearing in the second set of images of the item.

22. A method according to claim 21, wherein analyzing the histogram to determine whether the histogram is bi-modal includes:
- comparing a first number of pixels against a predetermined grayscale low threshold percentage; and
- comparing a second number of pixels against a predetermined grayscale high threshold percentage.

23. A method according to claim 21, wherein processing the second set of images further includes:
- creating a second histogram based on the second set of images;
- analyzing the second histogram to determine whether the second histogram is bi-modal; and
- automatically adjusting operating parameters of the data reader based on whether the second histogram is bi-modal.

\* \* \* \* \*